(12) United States Patent
Arnold et al.

(10) Patent No.: US 10,616,902 B2
(45) Date of Patent: Apr. 7, 2020

(54) RADIO COMMUNICATION NETWORK WITH RADIO SCHEDULER

(71) Applicant: Deutsche Telekom AG, Bonn (DE)

(72) Inventors: Paul Arnold, Frankfurt am Main (DE); Jakob Belschner, Frankfurt am Main (DE); Dirk Von Hugo, Darmstadt (DE)

(73) Assignee: DEUTSCHE TELEKOM AG, Bonn (DE)

( * ) Notice: Subject to any disclaimer, the term of this patent is extended or adjusted under 35 U.S.C. 154(b) by 13 days.

(21) Appl. No.: 15/788,822

(22) Filed: Oct. 20, 2017

(65) Prior Publication Data

US 2018/0124800 A1 May 3, 2018

(30) Foreign Application Priority Data

Oct. 28, 2016 (EP) .................................... 16196174

(51) Int. Cl.
*H04W 72/08* (2009.01)
*H04W 28/16* (2009.01)
(Continued)

(52) U.S. Cl.
CPC ......... *H04W 72/085* (2013.01); *H04L 5/0035* (2013.01); *H04W 28/16* (2013.01);
(Continued)

(58) Field of Classification Search
CPC . H04W 72/085; H04W 5/0035; H04W 28/16; H04W 72/1231; H04W 72/048;
(Continued)

(56) References Cited

U.S. PATENT DOCUMENTS

2001/0022558 A1* 9/2001 Karr, Jr. .................. G01S 1/026
342/450
2012/0113844 A1* 5/2012 Krishnamurthy ..... H04L 1/0026
370/252
(Continued)

OTHER PUBLICATIONS

Gramaglia Marco et al: "Flexible connectivity and QoE/QoS management for 5G Networks: The 5G NORMA view", 2016 IEEE International Conference on Communications Workshops (ICC), IEEE, May 23, 2016 (May 23, 2016), pp. 373-379, XP032919894.

*Primary Examiner* — Ivan O Latorre
(74) *Attorney, Agent, or Firm* — Leydig, Voit & Mayer, Ltd.

(57) ABSTRACT

A radio communication network includes: at least one base station configured to transmit a data flow to at least one user equipment by using radio resources scheduled to the at least one base station for transmission of the data flow; a radio scheduler configured to schedule the radio resources to the at least one base station according to a scheduling metric; a monitoring entity, configured to monitor performance information from the at least one base station; a controller, configured to adjust the scheduling metric of the radio scheduler based on the monitored performance information of the monitoring entity; and a database configured to store a plurality of scheduling metrics. The controller is configured to replace the scheduling metric with one of the scheduling metrics stored in the database or with a combination of scheduling metrics stored in the database.

15 Claims, 5 Drawing Sheets

(51) Int. Cl.
*H04L 5/00* (2006.01)
*H04W 72/12* (2009.01)
*H04W 24/02* (2009.01)
*H04W 72/04* (2009.01)

(52) U.S. Cl.
CPC ........ *H04W 72/1231* (2013.01); *H04W 24/02* (2013.01); *H04W 72/048* (2013.01)

(58) Field of Classification Search
CPC ............. H04W 24/02; H04W 72/1205; H04W 72/1226; H04L 5/0035
See application file for complete search history.

(56) References Cited

U.S. PATENT DOCUMENTS

| | | | |
|---|---|---|---|
| 2013/0301539 A1* | 11/2013 | Aguirre | H04W 28/16 370/329 |
| 2014/0128117 A1 | 5/2014 | Kwun et al. | |
| 2014/0254370 A1* | 9/2014 | Kakadia | H04W 28/0268 370/235 |
| 2014/0286295 A1* | 9/2014 | Liu | H04W 72/10 370/329 |
| 2015/0092704 A1 | 4/2015 | Chen et al. | |
| 2015/0334653 A1* | 11/2015 | Ang | H04W 28/0221 370/311 |
| 2015/0358829 A1* | 12/2015 | Arnott | H04W 72/06 455/454 |
| 2016/0037379 A1* | 2/2016 | Shafiee | H04W 28/0268 370/230.1 |
| 2017/0331577 A1* | 11/2017 | Parkvall | H04J 11/0079 |
| 2019/0174498 A1* | 6/2019 | Samdanis | H04W 16/10 |

\* cited by examiner

US 10,616,902 B2

RADIO COMMUNICATION NETWORK WITH RADIO SCHEDULER

CROSS-REFERENCE TO RELATED APPLICATIONS

Priority is claimed to European Patent Application No. EP 16196174.3, filed on Oct. 28, 2016, the entire disclosure of which is hereby incorporated by reference herein.

FIELD

The present disclosure relates to a radio communication network, in particular a 5G radio network, with a radio scheduler scheduling radio resources according to a scheduling metric. The disclosure particularly relates to applying a heterogeneous radio scheduler as a virtual network function (VNF) or a combination of multiple VNFs.

BACKGROUND

Within todays' mobile networks typically a unique vendor specific radio scheduler is implemented in the base stations' (BS) signal processing chain. Dependent on the network vendors' algorithms and the channel estimation information sent by the terminals, the scheduler decides adaptively which radio resources in frequency, time and space as well as which modulation and coding scheme (MCS) will be applied to transmit a data flow to a user equipment (UE). The scheduler is a homogeneous piece of software which supports several features, such as frequency selective scheduling (FSS), inter-cell interference coordination (ICIC) schemes, quality-of-service (QoS) awareness, etc. It may be updated with the next release when vendors offer software updates for their hardware. Today's radio scheduler can therefore only react on dynamic situations in the network, based on the actually distributed software schemes.

SUMMARY

In an exemplary embodiment, the present invention provides a radio communication network. The radio communication network includes: at least one base station configured to transmit a data flow to at least one user equipment by using radio resources scheduled to the at least one base station for transmission of the data flow; a radio scheduler configured to schedule the radio resources to the at least one base station according to a scheduling metric; a monitoring entity, configured to monitor performance information from the at least one base station; a controller, configured to adjust the scheduling metric of the radio scheduler based on the monitored performance information of the monitoring entity; and a database configured to store a plurality of scheduling metrics. The controller is configured to replace the scheduling metric with one of the scheduling metrics stored in the database or with a combination of scheduling metrics stored in the database.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
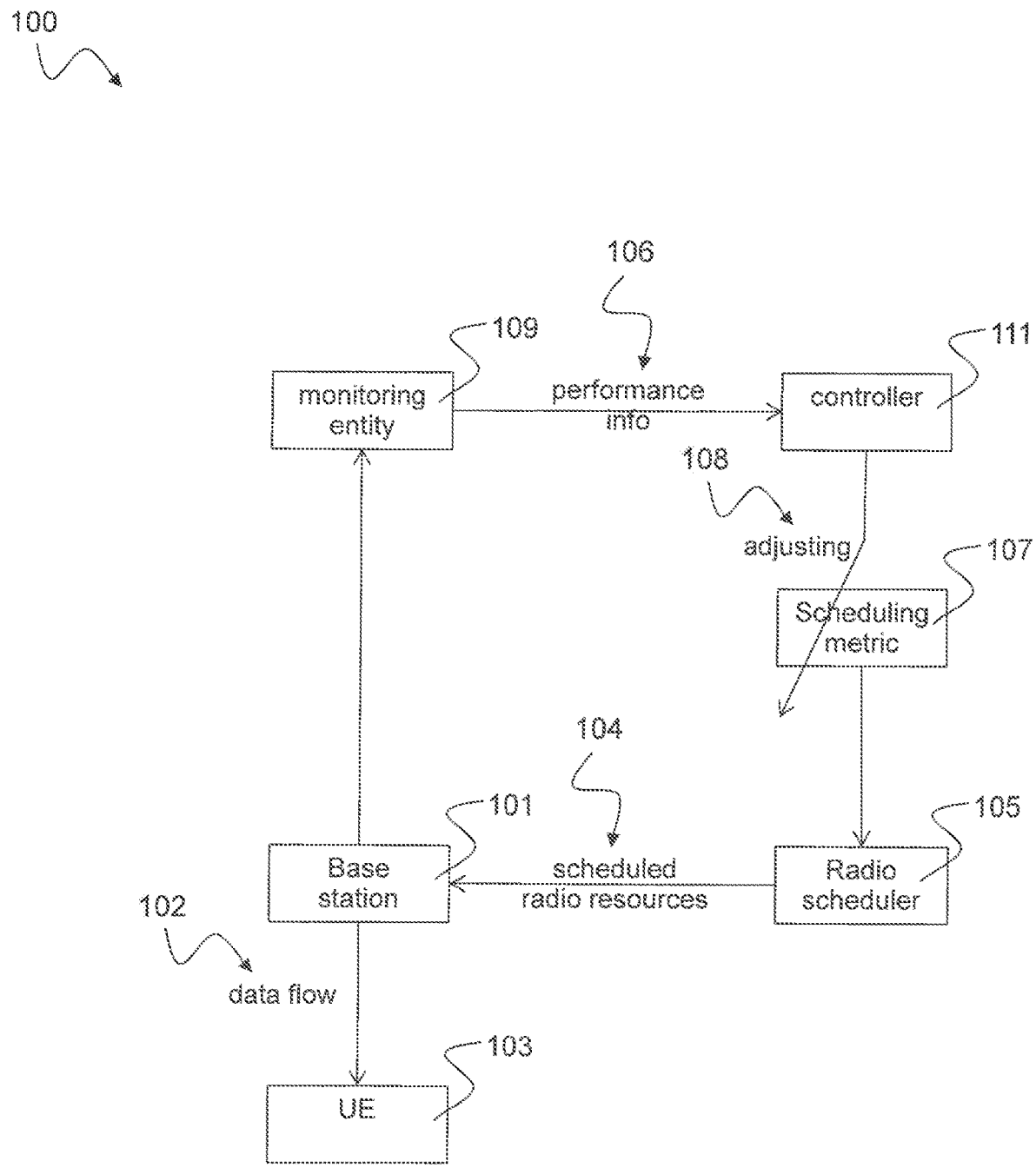
FIG. 1 shows a schematic diagram illustrating a radio communication network 100 according to the disclosure.

Exemplary embodiments of the invention provide for flexible and high performance radio scheduling in radio communication networks, in particular in next generation mobile networks where network resources are dynamically provided.

An exemplary embodiment of the invention provides a database for different flavored scheduling metrics which gives the opportunity to dynamically configure a scheduler. It includes a stack of scheduling metrics, synchronous and asynchronous ICIC schemes which can be configured individually for each BS or a BS cluster dependent on the requirements in terms of service level agreement (SLA), QoS, traffic demand and radio conditions of the active users. This will improve the overall performance of the system because scheduling and ICIC schemes can be flexibly and temporarily applied, when and where they are needed in the mobile network.

In order to describe the invention in detail, the following terms, abbreviations and notations will be used:
5G: fifth generation mobile network
5G NR: 5G New Radio
LTE: Long Term Evolution
BS, eNodeB: Base Station or radio cell
MCS: Modulation and Coding Scheme
UE: User Equipment
FSS: frequency selective scheduling
ICIC: inter-cell interference coordination
eICIC: enhanced inter-cell interference coordination
QoS: quality-of-service
SLA: service level agreement
CoMP: Coordinated Multi-Point
TPB: Transmission Point Blanking
CA: Carrier Aggregation
JT: Joint Transmission
HARQ: Hybrid automatic repeat request
MAC: Media Access Control layer
PHY: Physical layer
VNF: Virtual Network Function
DSP: Digital Signal Processor
KPI: Key Performance Indicator According to a first aspect, the invention relates to a radio communication network, comprising: at least one base station configured to transmit a data flow to at least one user equipment (UE) by using radio resources scheduled to the at least one base station for transmission of the data flow; a radio scheduler configured to schedule the radio resources to the at least one base station according to a scheduling metric;

a monitoring entity, configured to monitor performance information from the at least one base station; and a controller, configured to adjust the scheduling metric of the radio scheduler based on the monitored performance information of the monitoring entity.

By using a controller that adjusts the scheduling metric of the radio scheduler, based on a monitored performance information of the monitoring entity, such a radio communication network provides a highly flexible and high performance radio scheduling. The radio scheduler can be flexible implemented as software module inside the base station or as external network entity somewhere in the network. Lower layer parts of the scheduler may still be on DSPs (digital signal processors) not easy to vitualize, as mentioned in the text below.

In an implementation form, the radio communication network comprises a database configured to store a plurality of scheduling metrics, wherein the controller is configured to replace the scheduling metric with one of the scheduling metrics stored in the database or with a combination of scheduling metrics stored in the database.

By using such a database with different scheduling metrics, the radio scheduler can provide flexible scheduling of radio resources. For example, a first metric can be used for a first network where a specific service level agreement (SLA) is agreed upon while a second metric can be used for a second network where another kind of SLA is agreed upon, e.g., in the case that base station (BS) is shared among slices combined metric or overarching, mentioned in the text below as well.

In an implementation form of the radio communication network, the controller is configured to adjust the scheduling metric based on the plurality of scheduling metrics stored in the database.

This provides the advantage that radio resources can be flexibly scheduled depending on the respective scheduling metrics applied to the respective network section. For example, one network slice or logical network can be scheduled as to common mobile network while another slice or logical network can be scheduled as an ultra-reliable network.

In an implementation form of the radio communication network the controller is configured to replace the scheduling metric based on a geographic location of the at least one base station.

This provides the advantage of geographical flexibility in radio resource scheduling. Resources of a base station within an urban environment such as a city can be scheduled in another way than resources of a base station within a non-urban environment, such as, in sub-urban or rural areas.

In an implementation form of the radio communication network the controller is configured to replace the scheduling metric based on monitored information and/or requirements of incoming data flows of different services.

This provides the advantage of high flexible scheduling of radio resources. By monitoring information from incoming data flows of different services of different slices a dynamic scheduling can be realized that is dynamic in time and space.

In an implementation form, the radio communication network comprises a network orchestration entity, configured to load scheduling metrics from the plurality of scheduling metrics based on a request for setting up a network slice.

This provides the advantage that the radio communication network can be flexibly set up and re-configured, e.g., by a request from an operator.

In an implementation form of the radio communication network, the database comprises a plurality of basic scheduling schemes and/or a plurality of inter cell interference coordination (ICIC) schemes, and the controller is configured to select one or a combination of the basic scheduling schemes and/or one or a combination of the ICIC schemes from the database for adjusting the radio scheduler.

This provides the advantage that the scheduling metric can be flexibly selected from a plurality of predetermined basic scheduling metrics stored in a database and/or from a plurality of predetermined ICIC schemes stored in the database.

In an implementation form of the radio communication network, the basic scheduling schemes comprise at least one of the following: round robin, max/min, proportional fair, equal data rate, and the ICIC schemes comprise at least one of the following: enhanced inter-cell interference coordination (eICIC), carrier aggregation (CA) based ICIC, coordinated multi-point (CoMP) transmission point blanking (TPB), CoMP joint transmission (JT), coordinated beamforming, centralized scheduling, and/or the scheduling is based on at least one quality-of-service (QoS) class and/or a service level agreement (SLA).

This provides the advantage that the scheduling scheme can be selected from a plurality of common scheduling schemes such as eICIC, CA based ICIC, CoMP TPB, CoMP JT, coordinated beamforming, centralized and decentralized scheduling, etc. Each scheduling scheme may be selected based on QoS and/or SLA requirements and instantaneous status.

In an implementation form of the radio communication network, the monitoring entity is configured to monitor at least one of the following performance information from the at least one base station: a Quality of Service (QoS) for the at least one UE, a service level agreement (SLA) for a logical network including the at least one BS, a traffic demand for the at least one UE, conditions of a radio link to the at least one UE.

This provides the advantage that a lot of different performance information can be used as input to the selection of a scheduling scheme. The scheduling decision may be influenced by existing QoS classes (QCI dedicated bearer) as well. The metrics may be QoS aware and/or SLA aware.

In an implementation form of the radio communication network, the communication network comprises a plurality of base stations, and the controller is configured to adjust the scheduling metric of the radio scheduler per base station or per base station cluster of the plurality of base stations.

This provides the advantage that the whole network can be grouped into clusters where different scheduling schemes can apply resulting in a flexible scheduling and hence high throughput.

In an implementation form of the radio communication network, the network orchestration entity is configured to assign different radio schedulers to different groups according to specific scheduling metric requirements.

This provides the advantage that such radio schedulers may cooperate in scheduling radio resources.

In an implementation form of the radio communication network, the network orchestration entity is adapted to configure the scheduling metrics based on a service function chain template which defines multiple combinations of metrics and ICIC schemes.

This provides the advantage that the network orchestration entity can be used for configuring the different scheduling metrics in order to provide a flexible number of scheduling metrics.

In an implementation form of the radio communication network, the controller is configured to activate or deactivate combinations of scheduling metrics.

This provides the advantage that different combinations of scheduling metrics can be applied in a dynamic framework.

In an implementation form of the radio communication network, the radio scheduler is configured to apply a first scheduling metric to a cluster of base stations located in a first area of the radio communication network, and to apply a second scheduling metric to a cluster of base stations located in a second area of the radio communication network.

This provides the advantage that the scheduling metrics can be geographically flexible applied to the communication network.

In an implementation form of the radio communication network, the radio communication network (100) comprises a network according to a fifth generation (5G) or according to a further generation, and at least a part of the radio scheduler is implemented as a virtual network function of an activation layer of the 5G network communicating with a physical layer of the 5G network.

This provides the advantage that the radio scheduler can be flexibly applied in at least one network slice of a 5G network providing fulfillment of conflicting KPIs (Key Performance Indicators) of different services.

In an implementation form of the radio communication network the radio scheduler is configured to schedule radio resources of a first network slice of the 5G network and radio resources of a second network slice of the 5G network according to a common scheduling metric.

This provides the advantage that different network slices can be formed and aggregated using the common scheduling metric.

In an implementation form of the radio communication network, the common scheduling metric is designed according to an optimization criterion to best fit requirements of the first network slice and the second network slice concurrently.

This provides the advantage that requirements of different network slices can be concurrently met.

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

It is understood that comments made in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

The radio communication network as described hereinafter may include a plurality of different network entities. A network entity may be a computer host, a computer server or some network node. A network entity may be a hardware unit, e.g. a computer server, a network node or device, a PC, a tablet, a smartphone, a router, a gateway or a whole computer network. A network entity may be a software unit, e.g. an application program or software module on a PC, tablet, smartphone or any other hardware device.

The radio communication network or radio communication system or wireless communication network may be implemented by various technologies, in particular as a communication network based on mobile communication standards such as LTE, in particular LTE-A and/or OFDM and successor standards such as 5G. The components and network nodes of such a communication network described below may be implemented as electronic devices or electronic network entities. The described devices and network entities may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The described network components, in particular the radio cells and user equipments may be configured to transmit and/or receive radio signals and performing associated signal processing. Radio signals may be or may include radio frequency signals radiated by a radio transmitting device (or radio transmitter or sender) with a radio frequency lying in a range of about 3 kHz to 300 GHz. The frequency range may correspond to frequencies of alternating current electrical signals used to produce and detect radio waves.

The communication networks described herein after may be designed in accordance to mobile communication standards such as, e.g., the Long Term Evolution (LTE) standard or the advanced version LTE-A thereof. LTE (Long Term Evolution), marketed as 4G LTE and 5G NR (new radio), is a standard for wireless communication of high-speed data for mobile phones and data terminals. 5G NR is a 3GPP terminology.

FIG. 1 shows a schematic diagram illustrating a radio communication network 100 according to the disclosure.

The radio communication network 100 includes at least one base station 101, a radio scheduler 105, a monitoring entity 109 and a controller 111. The at least one base station 101 is configured to transmit a data flow 102 to at least one user equipment (UE) 103 by using radio resources 104, e.g., time-frequency resources scheduled to the at least one base station 101 for transmission of the data flow 102. The radio scheduler 105 schedules the radio resources 104 to the at least one base station 101 according to a scheduling metric 107. The monitoring entity 109 monitors performance information 106 from the at least one base station 101. The controller 111 adjusts 108 the scheduling metric 107 of the radio scheduler 105 based on the monitored performance information 106 of the monitoring entity 109. The radio scheduler 105 may be a network entity collocated to the base station 101 or integrated in the base station 101. Then, the radio resources may be scheduled by the base station. Alternatively, the radio scheduler 105 may be located in a specific geographic distance to the base station. One radio scheduler 105 may schedule radio resources 104 for one or more base stations 101.

The radio communication network 100 may further include a database storing a plurality of scheduling metrics, e.g., a database 207 as described below with respect to FIG. 2. The controller 201 may replace the scheduling metric 107 with one of the scheduling metrics 208 stored in the database or with a combination of scheduling metrics stored in the database. The controller 111 may deactivate or activate the scheduling metrics 208 based on sct set up given by orchestrator 205 as described below. The controller 111 may adjust 108 the scheduling metric 107 based on the plurality of scheduling metrics stored in the database. The controller 111 may for example replace the scheduling metric 107 based on a geographic location of the at least one base station, e.g., as described below with respect to FIG. 2. The controller 111 may replace the scheduling metric 107 based on monitored information and/or requirements of incoming data flows of different services.

The radio communication network 100 may include a network orchestration entity, e.g. an orchestrator 205 as described below with respect to FIG. 2, configured to load scheduling metrics from the plurality of scheduling metrics based on a request for setting up a network slice or a logical network, e.g., a network slice 510b, 511b, 512b as described below with respect to FIGS. 4 and 5.

The database may include a plurality of basic scheduling schemes and/or a plurality of inter cell interference coordination (ICIC) schemes, e.g. schemes 208, 206 as described below with respect to FIG. 2. The controller 111 may select one or a combination of the basic scheduling schemes and/or one or a combination of the ICIC schemes from the database for adjusting the radio scheduler 105.

The basic scheduling schemes may include: round robin, max/min, proportional fair, equal data rate, e.g. as described below with respect to FIG. 2. The ICIC schemes may include: enhanced inter-cell interference coordination (eICIC), carrier aggregation (CA) based ICIC, coordinated multi-point (CoMP) transmission point blanking (TPB), CoMP joint transmission (JT), coordinated beamforming, centralized scheduling, e.g. as described below with respect to FIG. 2. The scheduling may be based on at least one quality-of-service (QoS) class and/or at least one service level agreement (SLA).

The monitoring entity 109 may monitor the following performance information from the at least one base station: a Quality of Service (QoS) for the at least one UE 103, a service level agreement (SLA) for a logical network including the at least one base station, a traffic demand for the at least one UE 103, conditions of a radio link to the at least one UE 103, etc.

The communication network 100 may include a plurality of base stations. The controller 111 may adjust the scheduling metric 107 of the radio scheduler 105 per base station or per base station cluster. The network orchestration entity 205 may assign different radio schedulers to different groups of base stations according to specific scheduling metric requirements.

The network orchestration entity 205 may configure the scheduling metrics based on a service function chain template, for example. The controller 111 may activate or deactivate combinations of scheduling metrics. For example, the radio scheduler 105 may apply a first scheduling metric to a cluster of base stations located in a first area of the radio communication network 100, and a second scheduling metric to a cluster of base stations located in a second area of the radio communication network 100.

The radio communication network 100 may include a network 400, 500 according to a fifth generation (5G) or according to a further generation, e.g., a network 400, 500 described below with respect to FIGS. 4 and 5. At least a part of the radio scheduler 105 may be implemented as a virtual network function of an activation layer of the 5G network communicating with a physical layer of the 5G network, e.g., as described below with respect to FIGS. 4 and 5.

The radio scheduler 105 may be configured to schedule radio resources 104 of a first network slice, e.g., a first network slice 510b shown below with respect to FIG. 5, of the 5G network and radio resources of a second network slice, e.g., a second network slice 511b shown below with respect to FIG. 5, of the 5G network according to a common scheduling metric. This common scheduling metric may be designed according to an optimization criterion to best fit requirements of the first network slice 510b and the second network slice 511b concurrently.

A method for scheduling radio resources may be implemented in the radio communication network 100. The method may include: transmitting, by at least one base station, a data flow 102 to at least one user equipment 103 by using radio resources 104 scheduled to the at least one base station 101 for transmission of the data flow 102; scheduling, by a radio scheduler 105 the radio resources 104 to the at least one base station 101 according to a scheduling metric 107; monitoring, by a monitoring entity 109, performance information 106 from the at least one base station 101; and adjusting, by a controller 111, the scheduling metric 107 of the radio scheduler 105 based on the monitored performance information 106 of the monitoring entity 109.

Figure 2:
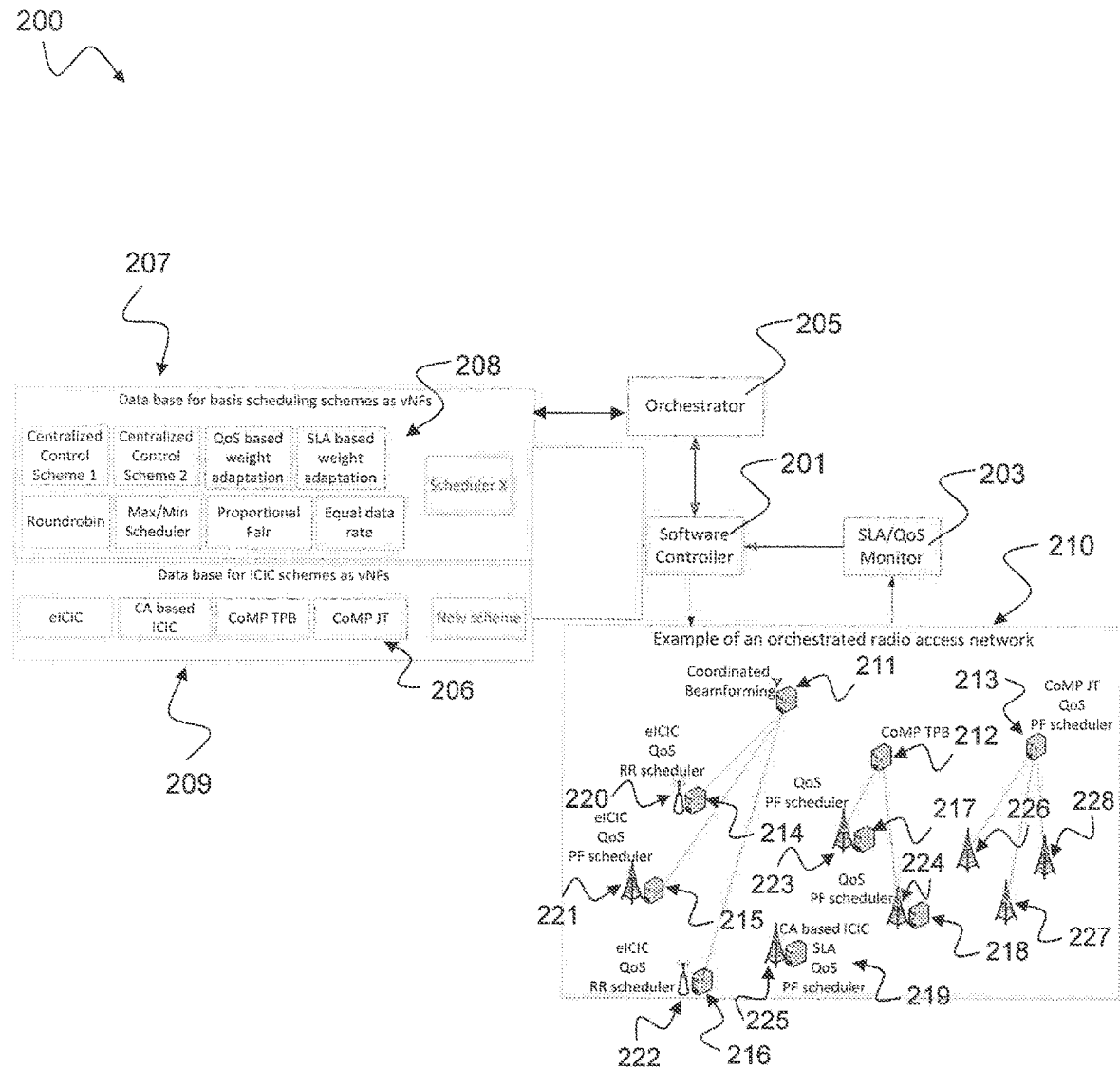
FIG. 2 shows a schematic diagram illustrating a radio communication network 200 according to the disclosure.

FIG. 2 shows a schematic diagram illustrating a radio communication network 200 according to the disclosure. The radio communication network 200 is a specific implementation of the radio communication network 100 described above with respect to FIG. 1.

As shown in FIG. 2, the idea is to have a database 207 with all kinds of scheduling schemes 208 which can be flexibly combined or exchanged at the base station when necessary based on SDN and NFV principles. During some situations in the network 200 it makes sense to create temporarily, e.g. a BS cluster where a proportional fair (PF) based, QoS aware, joint transmission coordinated multi point (JT CoMP) flavored scheduler is applied (right cluster within the radio access network 210 with elements 213, 226, 227, 228). While for another area in the network 210 a smaller cluster is created where a PF and QoS flavored scheduler is applied at each BS of the cluster. In addition a centralized entity 212 which performs CoMP Transmission point blanking (TPB) may be formed (middle cluster within the network 210 of FIG. 2 including elements 212, 217, 218, 223, 224) satisfying the QoS of each specific user. Another base station 225 (with collocated radio scheduler 218) schedules radio resources for its own based on a combination of a PF, SLA and QoS aware with carrier aggregation based ICIC scheme. The systems gains from the flexibility to react on locally dynamic changes in the network (e.g., a lot of cell edge UEs got active and centralized scheduling should be applied to improve cell edge performance without decreasing the spectral efficiency of the system).

To adapt the scheduling scheme in a dynamic way as described above, a centralized software controller 201 as well as a live monitoring entity 203 is provided which observes the current performance at each individual BS or radio cell. The monitor 203 provides frequently the status and the controller 201 derives a critical situation (e.g., SLA of a network slice or QoS of a specific flow cannot be fulfilled), as an alternative. Then, the controlling entity 201 takes a decision what kind of scheduling algorithms and metrics should be used at the problematic area within the network 210. For instance, a lot of cell edge users are active and the cell edge performance of a certain BS cluster needs to be increased, then it may make sense to load temporarily a centralized scheduler which interacts with the BS local proportional fair and QoS aware flavored scheduler. The controller 201 loads an individualized scheduler for that specific issue to improve the performance of that part of the network 210. The controller 201 can access the database 207 via the orchestrator 205 or in in alternative implementation (not shown in FIG. 2), the controller 201 can directly access the database 207 without the orchestrator 205.

The radio communication network 200 shown in FIG. 2 includes a plurality of radio cells 221, 222, 223, 224, 225, 226, 227, 228, for example base stations or WiFi Hotspots or other small cells, a plurality of radio schedulers 214, 215, 216, 217, 219, 224 and other network schedulers 211, 212, 213, a monitor 203, e.g. for monitoring service level agreements and/or QoS and a controller 201, e.g. a software controller. The plurality of radio cells 221, 222, 223, 224, 225, 226, 227, 228, the plurality of radio schedulers 214, 215, 216, 217, 219, 224 and other network schedulers 211, 212, 213 are arranged in an orchestrated radio access network 210 that may be controlled by the software controller 201 and monitored by the SLA/QoS monitor 203. The radio communication network 200 further includes an orchestrator 205 for setting-up or initializing the radio access network 210. The radio communication network 200 further includes a database 207 for storing basis scheduling schemes 208 and a database 209 for storing ICIC schemes, e.g., as virtual network functions.

The radio cells 221, 222, 223, 224, 225, 226, 227, 228 may transmit data flows to corresponding user equipments (not shown in FIG. 2) by using radio resources, e.g. time-frequency resources scheduled to the radio cells by radio schedulers 214, 215, 216, 217, 224, 213 for transmission of the data flows, e.g. as described above with respect to FIG. 1.

The radio schedulers 214, 215, 216, 217, 219, 224 may be collocated to the corresponding radio cells 221, 222, 223, 224, 225, 226, 227, 228 and may schedule radio resources, e.g. time-frequency space resources to the corresponding radio cells according to a respective scheduling metric, e.g. as described above with respect to FIG. 1.

The SLA/QoS monitor 203 monitors performance information from the radio cells 221, 222, 223, 224, 225, 226, 227, 228 of the radio access network 210 and the controller 201 adjusts/adapts the respective scheduling metric of the corresponding radio scheduler 214, 215, 216, 217, 219, 224 based on the monitored performance information.

The software controller 201 may for example adjust a respective scheduling metric based on the scheduling metrics 208 stored in the database 207. The software controller 201 may for example adjust a respective scheduling metric by replacing the respective scheduling metric with one of the scheduling metrics 208 stored in the database 207 or with a combination of scheduling metrics 208 stored in the database 207. The replacing of a respective scheduling metric may depend on a geographic location of the radio cell 221, 222, 223, 224, 225, 226, 227, 228 and/or the radio scheduler 214, 215, 216, 217, 219, 224. The software controller 201 may for example replace a respective scheduling metric based on monitored information and/or requirements of incoming data flows of different services.

The radio cells 221, 222, 223, 224, 225, 226, 227, 228 and radio schedulers 214, 215, 216, 217, 219, 224 of the radio access network 210 may be grouped in different clusters as shown in FIG. 2. For example, a first cluster (or first logical network) may include a coordinated beamforming network entity 211 coordinating an eICIC QoS round-robin (RR) radio scheduler 214 collocated with a small radio cell 220, an eICIC QoS proportional fair (PF) radio scheduler 215 collocated with a base station 221 and an eICIC QoS round robin radio scheduler 216 collocated with a small radio cell 222.

A second cluster (or second logical network) may include a coordinated multipoint (CoMP) TPS network entity 212 coordinating a QoS PF radio scheduler 217 collocated with a base station 223 and a QoS PF radio scheduler 218 collocated with a base station 224. A slice, however, can also consist of different clusters.

A third cluster (or third logical network) may include a service level agreement (SLA) QoS PF radio scheduler 219 collocated with a base station 225.

A fourth cluster (or fourth logical network) may include a stand-alone CoMP joint transmission (JT) QoS PF radio scheduler 213 scheduling three base stations 226, 227, 228.

The orchestrator 205 may load scheduling metrics from the plurality of scheduling metrics 208 stored in the database 207, e.g. based on a request for setting up a network slice, e.g. a network slice 510b, 511b, 512b as described below with respect to FIGS. 4 and 5. The network slice may include the whole orchestrated radio access network 210 or alternatively one or more clusters or logical networks as described above.

The orchestrator 205 may assign different radio schedulers 214, 215, 216, 217, 219, 224 to different groups of radio cells 220, 221, 222, 223, 224, 225, 226, 227, 228 according to their specific scheduling metric requirements. The orchestrator 205 may for example configure the scheduling metrics 208 based on a service function chain template which defines multiple combinations of metrics and ICIC schemes.

The software controller 201 may select one or a combination of the basic scheduling schemes 208 and/or one or a combination of the ICIC schemes 206 via the orchestrator 205 from the database 207, 209 for adjusting a respective radio scheduler schedulers 214, 215, 216, 217, 219, 224. The basic scheduling schemes 208 may include for example the schemes round robin, max/min, proportional fair, equal data rate, etc. The ICIC schemes 206 may for example include the schemes enhanced inter-cell interference coordination (eICIC), carrier aggregation (CA) based ICIC, coordinated multi-point (CoMP) transmission point blanking (TPB), CoMP joint transmission (JT), coordinated beamforming, centralized scheduling, etc. The scheduling may be based on a quality-of-service (QoS) class and/or a service level agreement (SLA). The SLA/QoS monitor 203 may for example monitor performance information from the radio cells 220, 221, 222, 223, 224, 225, 226, 227, 228, such as: QoS, SLA for a logical network 210, a traffic demand for a UE and conditions radio links to the UEs.

The software controller 201 may adjust the scheduling metrics of the radio schedulers 214, 215, 216, 217, 219, 224 per radio cell or per radio cell cluster. The software controller 201 may activate or deactivate combinations of scheduling metrics (208). A radio scheduler (or the radio schedulers) of a specific logical network (e.g. network 210) may apply a first scheduling metric to a cluster of radio cells 220, 221, 222 located in a first area of the radio communication network 200, and a second scheduling metric to a cluster of base stations 223, 224 located in a second area of the radio communication network 200.

The radio communication network 200 may include a network 400, 500 according to a fifth generation (5G) or according to a further generation, e.g. as described below with respect to FIGS. 4 and 5. A part of the radio schedulers 214, 215, 216, 217, 219, 224 or all of them may be implemented as a virtual network function 522 of an activation layer 404 of the 5G network 400, 500 communicating with a physical layer 405 of the 5G network 400, 500, e.g. as described below with respect to FIGS. 4 and 5.

The radio schedulers may schedule radio resources of a first network slice 510b of the 5G network 400, 500 and radio resources of a second network slice 511b of the 5G network 400, 500 according to a common scheduling metric which may be designed according to an optimization criterion to best fit requirements of the first network slice 510b and the second network slice 511b concurrently.

Figure 3:
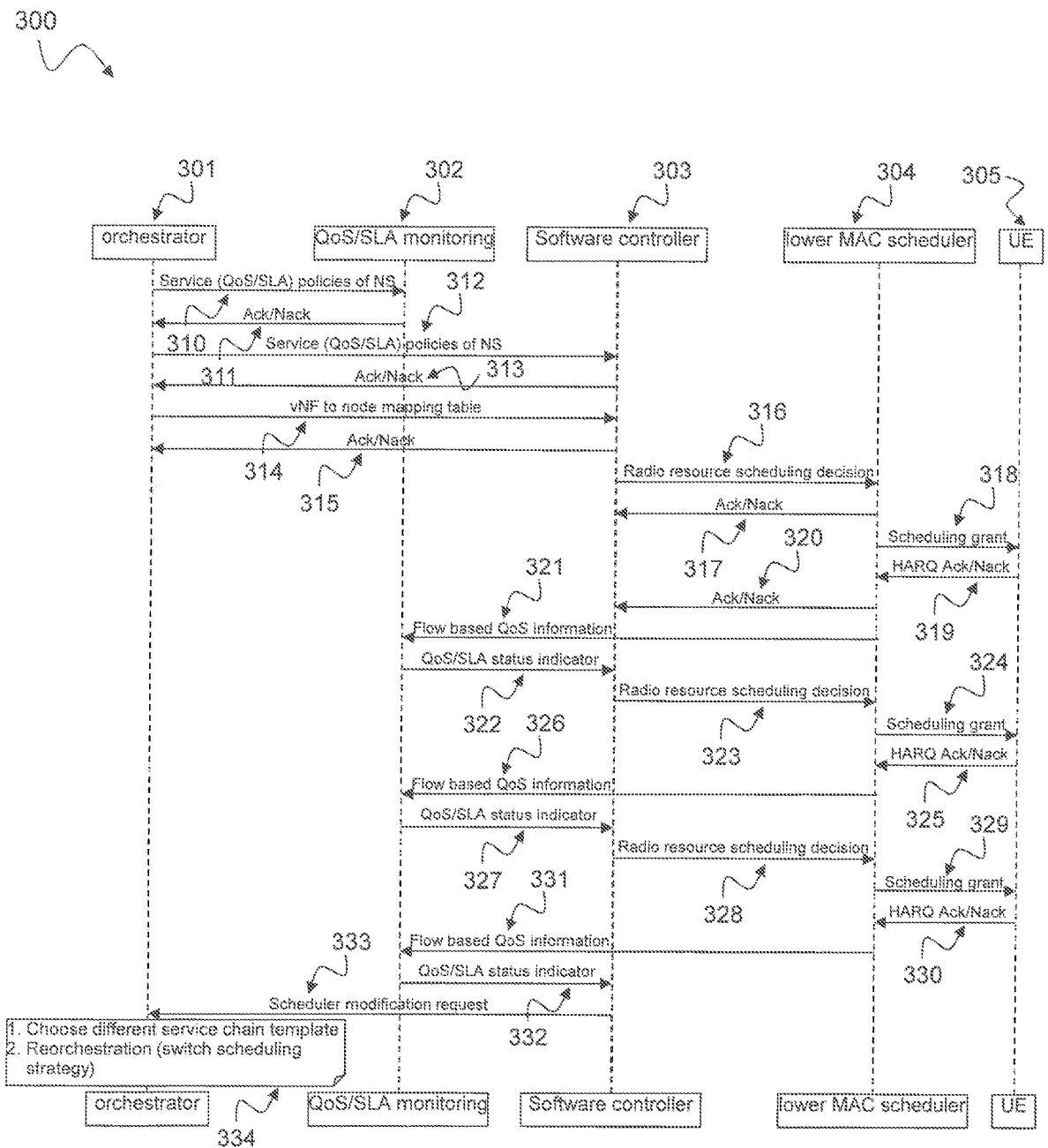
FIG. 3 shows a message sequence diagram 300 illustrating messaging between the entities of a radio communication network according to the disclosure.

FIG. 3 shows a message sequence diagram 300 illustrating messaging between the entities of a radio communication network according to the disclosure. A possible function split between an orchestrator 301 that may correspond to the orchestrator 205 depicted in FIG. 2, a QoS/SLA monitoring entity 302 that may correspond to the SLA/QoS monitor 203 depicted in FIG. 2 or to the monitoring entity 109 depicted in FIG. 1, a software controller 303 that may correspond to the software controller 201 depicted in FIG. 2 or to the controller 111 depicted in FIG. 1, a lower MAC scheduler 304 that may correspond to a respective radio scheduler 214, 215, 216, 217, 218, 219 depicted in FIG. 2 or to the radio scheduler 105 depicted in FIG. 1 and a UE 305 that may correspond to the UE 103 depicted in FIG. 1 is shown in FIG. 3. The radio scheduling functions may be implemented at a lower MAC layer which gets information from PHY layer.

The messages as described in the following are examples, other implementations are possible as well. In the example of FIG. 3, the orchestrator 301 transmits a "Service (QoS/SLA) policies of NS" message 310 to QoS/SLA monitoring entity 302 that answers with an "Ack or Nack" message 311. Then, the orchestrator 301 transmits a "Service (QoS/SLA) policies of NS" message 312 to software controller 303 that answers with an "Ack or Nack" message 313. Then, the orchestrator 301 transmits a "vNF to node mapping table" message 314 to software controller 303 that answers with an "Ack or Nack" message 315.

The software controller 303 transmits a "Radio resource scheduling decision" message 316 to the lower MAC scheduler 304 that answers with an "Ack or Nack" message 317. Then, the lower MAC scheduler 304 transmits a "scheduling grant" message 318 to the UE 305 that answers with an "HARQ Ack or Nack" message 319. Then, the lower MAC scheduler 304 transmits an "Ack/Nack" message 320 to the software controller 303 and transmits a "Flow based QoS information" message 321 to the QoS/SLA monitoring entity 302 upon which message 321 the QoS/SLA monitoring entity 302 answers with a "QoS/SLA status indicator" message 322. Then, a "radio resource scheduling decision" message 323 is sent to the lower MAC scheduler 304 which forwards a "Scheduling grant" message 324 to the UE 305. The UE 305 answers with a "HARQ Ack/Nack" message 325.

The lower MAC scheduler 304 transmits a "Flow based QoS information" message 326 to the QoS/SLA monitoring entity 302 upon which message 326 the QoS/SLA monitoring entity 302 answers to the software controller 303 with a "QoS/SLA status indicator" message 327. Then, a "radio resource scheduling decision" message 328 is sent to the lower MAC scheduler 304 which forwards a "Scheduling grant" message 329 to the UE 305. The UE 305 answers with a "HARQ Ack/Nack" message 330.

The lower MAC scheduler 304 transmits a "Flow based QoS information" message 331 to the QoS/SLA monitoring entity 302 upon which message 331 the QoS/SLA monitoring entity 302 answers to the software controller 303 with a "QoS/SLA status indicator" message 332. Then, a "Scheduler modification request" message 333 is sent to the orchestrator 301 upon which message 333 the orchestrator 301 chooses different service function chain template and performs reorchestration (switch scheduling strategy) 334.

The message sequence diagram 300 represents a possible implementation of a method for scheduling radio resources in a radio communication network as described above with respect to FIG. 1.

Figure 4:
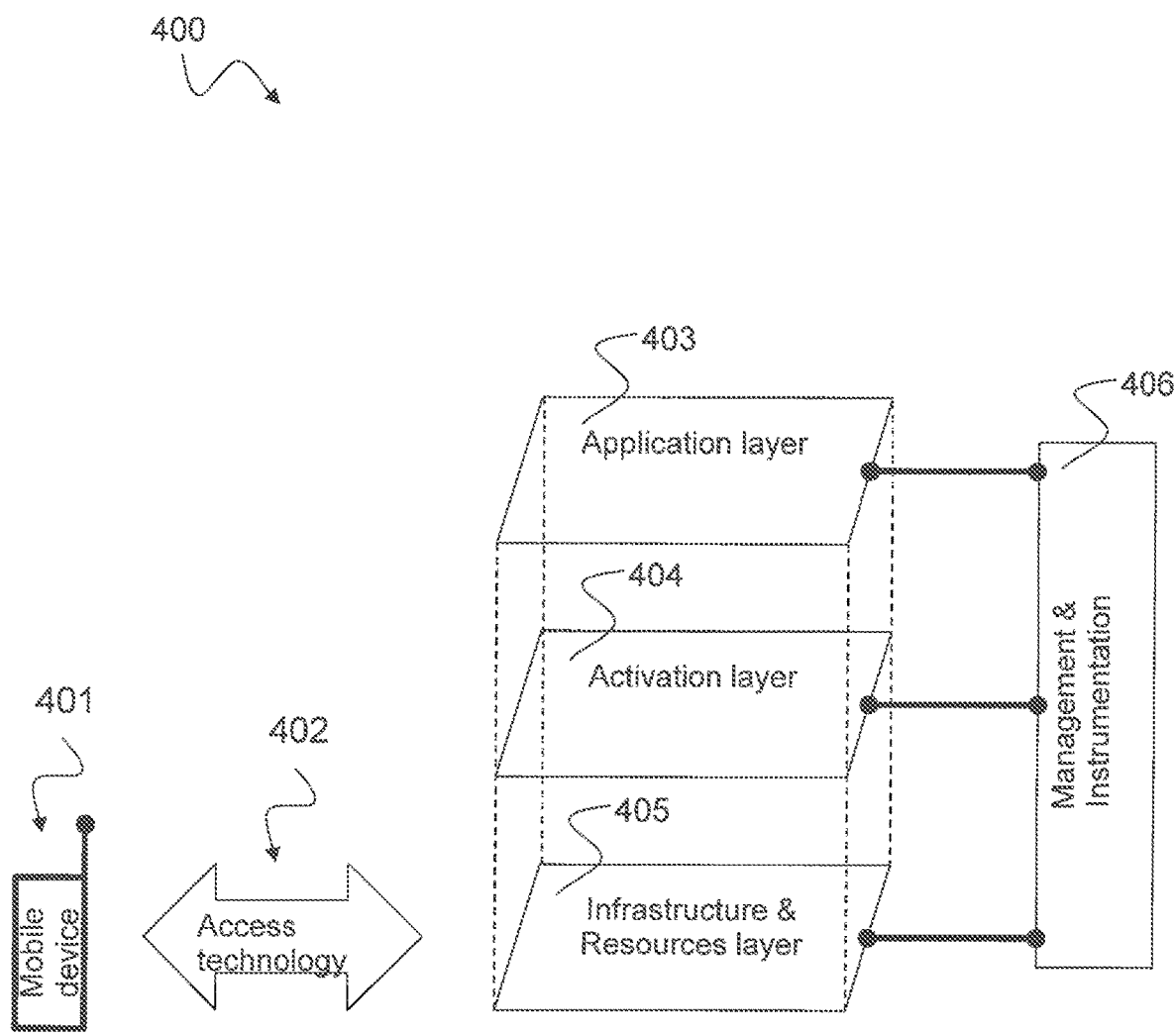
FIG. 4 shows a schematic diagram illustrating an exemplary 5G system architecture 400 which radio resources can be scheduled by a radio scheduler according to the disclosure.

FIG. 4 shows a schematic diagram illustrating an exemplary 5G system architecture 400 which radio resources can be scheduled by a radio scheduler according to the disclosure.

The 5G system architecture 400 includes an area with 5G communication terminals 401 which are connected via different access technologies 402 to a multilayered communication structure. This multilayered communication structure includes an infrastructure & resources layer 405, an activation layer 404 and an application layer 403 which are managed by a management & instrumentation layer 406.

The infrastructure & resources layer 405 includes the physical resources of a converged network structure of fixed and mobile network components ("Fixed-Mobile Convergence") with access point, cloud nodes (consisting of processing and storage node), 5G devices such as mobile phones, portable devices, CPEs, machine communication modules and other network nodes and related links. 5G devices can include multiple and configurable capabilities and act, for example, as a relay or hub or can operate depending on the particular context as a computer or memory resource. These resources are provided to the higher layers 404, 403 and the management & instrumentation layer 406 via corresponding APIs (application program interfaces). Monitoring the performance and the configurations are inherent to such APIs.

The activation layer 404 includes a library of functions that are needed within a converged network in the form of blocks of a modular architecture. These include functions that are implemented in software modules that can be retrieved from a storage location of the desired location, and a set of configuration parameters for specific parts of the network, for example, the radio access. These features and capabilities can be accessed on demand by the management & instrumentation layer 406 by using the provided APIs. Certain functions may exist in multiple variants, for example, different implementations of the same functionality having different performance or characteristic.

The application layer 403 includes specific applications and services of the network operator, the company, the vertical operator or by third parties who use the 5G network. The interface to the management & instrumentation layer 406 allows to use certain dedicated network slices for an application, or to assign an application to an existing network slice.

The management & instrumentation layer 406 is the contact point for the use cases (use cases, business models) to put into actual network functions and slices. It defines the network slices for a given application scenario, concetenates the relevant modular network functions, assigns the relevant performance configurations and maps all to the resources of the infrastructure & resources layer 405. The management & instrumentation layer 406 also manages the scaling of the capacity of these functions as well as their geographical distribution. In certain applications, the management & instrumentation layer 406 may also have skills that allow third parties to produce and manage their own network slices by the use of APIs. Because of the numerous tasks of the management & instrumentation layer 406, these are not a monolithic block of functionality but rather a collection of modular functions, integrating progresses that have been achieved in different network domains, such as NFV (network function virtualization), SDN (software-defined networking) or SON (self-organizing networks). The management & instrumentation layer 106 utilizes data assisted intelligence to optimize all aspects of service assembly and deployment.

The radio scheduler 105 described above with respect to FIG. 1 may be used to schedule radio and/or network resources of the communication network 400. The radio scheduler 105 may be a part of the network 400 or may be arranged outside the network 400. The radio scheduler 105 may for example be implemented in the activation layer 404, e.g., as a virtual network function 522 in a network slice or alternatively located at the management & instrumentation layer 406. Alternatively, each network slice or slice instance may include a radio scheduler 105. Network entities requesting resources of the communication network 400 may for example be network nodes of the infrastructure and resources layer 405, or network nodes of the activation layer 404 or network slices or slice instances of the application layer 403. Network entities requesting resources of the communication network 400 may also be mobile devices 401, base stations, base station controllers, radio network controllers etc. requesting resources for initiating a communication channel over the communication network 400.

The 5G network 400 increases the efficiency of communication and provides in particular a higher data throughput, lower latency, particularly high reliability, a much higher connection density and a larger mobility area. The 5G network 400 increases the operational flexibility and provides tailored features and functions while saving network resources. This increased performance is accompanied by the ability to control highly heterogeneous environments and the ability to secure trust, identity and privacy of users.

The presented devices, systems and methods are provided for the purpose to improve the efficiency of communication and charging in communication networks, in particular in 5G communications networks with multiple network slices, as described below.

Figure 5:
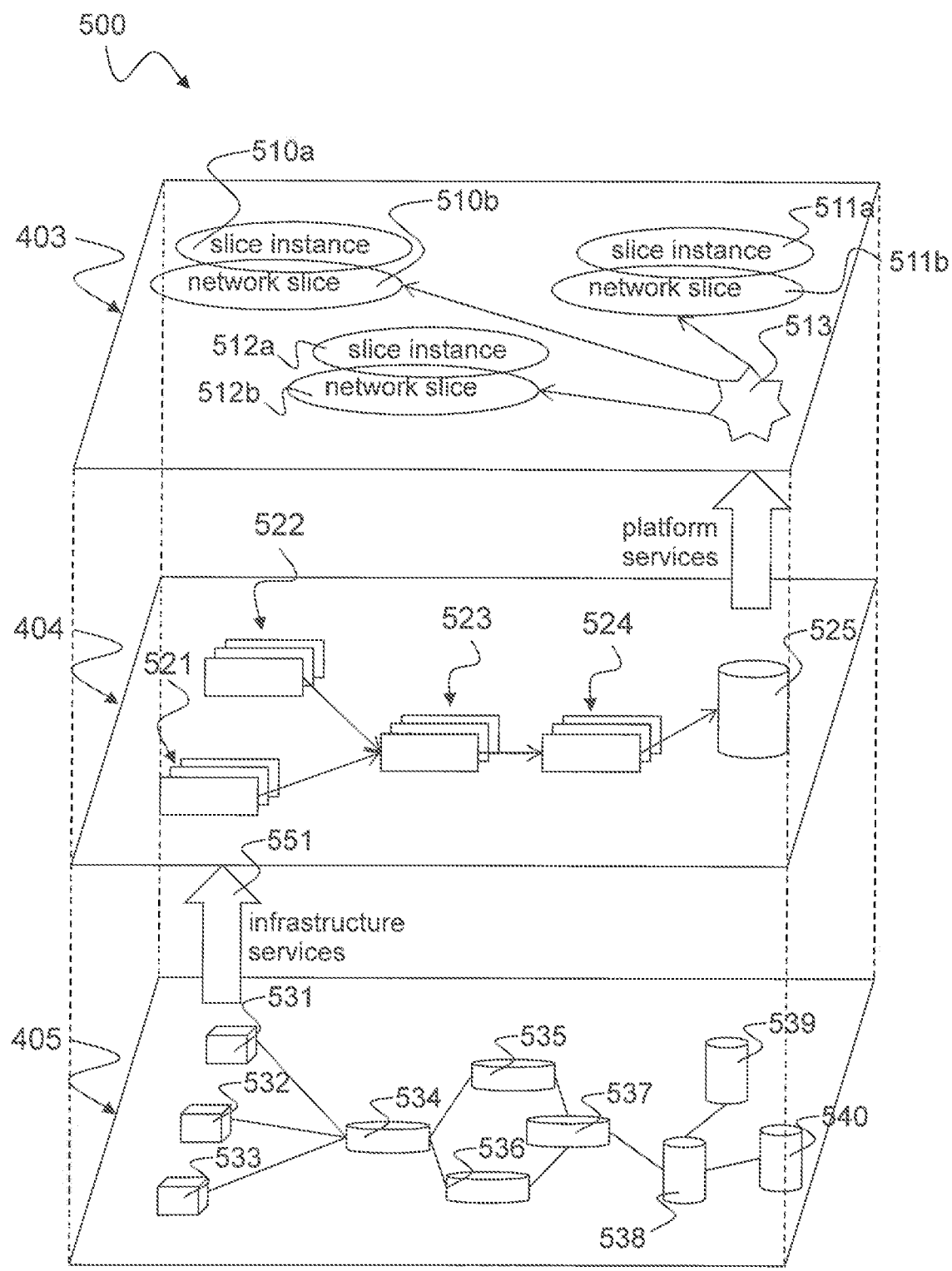
FIG. 5 shows a schematic diagram illustrating an exemplary 5G communication network 500 including a plurality of network slices which radio resources can be scheduled by a radio scheduler according to the disclosure.

FIG. 5 shows a schematic diagram illustrating an exemplary 5G communication network 500 including a plurality of network slices which radio resources can be scheduled by a radio scheduler according to the disclosure.

The 5G-communication network 500 includes an infrastructure & resources layer 405, an activation layer 404 and an application layer 403, as described above with respect to FIG. 4.

The infrastructure & resources layer 405 includes all physical assets that are associated with a network operator, i.e., locations, cable, network nodes, etc. This layer 405 forms the basis for all network slices. It is structured as generic as possible without too many specialized engineering units. The infrastructure & resources layer 405 conceals any kind of user-specific implementation towards the upper layers, so that the remaining systems can be used optimally for different slices. Components of the infrastructure and resources layer 405 are based on hardware and software or firmware that is needed for each operation and that is provided to the overlying layers as resource objects. Objects of infrastructure & resources layer 405, for example, include virtual machines, virtual links or connections and virtual networks, for example, virtual access node 531, 532, 533, virtual network nodes 534, 535, 536, 537 and virtual computer nodes 538, 539, 540. As the term "virtual" implies, the infrastructure and resources layer 405 provides the objects in the form of an "infrastructure as a service" 551, i.e. in an abstracted, virtualized form to the next higher layer 404.

The activation layer 404 is arranged above the infrastructure & resources layer 405. It uses the objects of the infrastructure & resources layer 405 and adds additional functionality to these objects, for example in the form of (non-physical) software objects/VNFs (virtual network functions) to enable generation of any type of network slices and hence to provide a platform as a service to the next higher layer 403.

Software objects can exist in any granularity, and may include a tiny or a very large fragment of a network slice. In order to be able to allow the generation of network slices on a suitable level of abstraction in the activation layer 404 different abstract objects 521 can be combined with other abstracted objects and virtual network functions 522 to form combined objects 523, which can be converted into aggregated objects 524 which can be provided in an object library 525 to the next higher level. Thus, the complexity can be hidden behind the network slices. For example, a user can create a mobile broadband slice and define merely a KPI (Key Performance Indicator) without having to specify specific features such as individual local antenna cover, backhaul links and specific parameterization degrees. Supporting an open environment, allowing to add or delete network functions on demand, is an important skill of the activation layer 404 that supports the dynamic rearrangement of functions and connectivities in a network slice, for example, by using SFC (Service Function Chaining) or modifying software so that the functionality of a slice can be completely pre-defined and can include both approximately static software modules and dynamically addable software modules.

A network slice can be regarded as software-defined entity that is based on a set of objects that define a complete network. The activation layer 404 can include all software objects that are necessary to provide the network slices and the appropriate skills to handle the objects. The activation layer 404 may be considered as a type of network operating system complemented by a network production environment. An important task of the activation layer 404 is defining the appropriate levels of abstraction. So network operators have sufficient freedom to design their network slices while the platform operator can still keep maintaining and optimizing the physical nodes. For example, the execution of everyday tasks, such as, adding or replacing NodeBs, etc., is supported without the intervention of the network client. The definition of suitable objects that model a complete telecommunications network, is one of the essential tasks of the activation layer 104 in developing the network slices environment.

A network slice, also known as 5G Slice, supports communication services of a certain type of connection with a particular type of handling of the C (Control) and U (User Data) layer. A 5G slice is composed of a collection of different 5G network functions and specific radio access technology (RAT) settings that are combined together for the benefit of the specific use case. Therefore, a 5G Slice spans all domains of the network, for example, software modules that run on a cloud node, specific configurations of the transport network that support a flexible location of functions, a particular radio configuration or even a particular access technology as well as a configuration of 5G devices. Not all slices contain the same features, some features that today seem to be essential for a mobile network can even not occur in some slices. The intention of the 5G Slice is to provide only the functions that are necessary for the specific use case and to avoid any other unnecessary functionalities. This flexibility allows for both the widening of existing applications as well as for creating new applications. Third party devices can thus be granted permission to control certain aspects of slicing through appropriate APIs to provide such customized services.

The application layer 403 includes all generated network Slices 510b, 511b, 512b and offers these as "network as a service" to different network users, for example, different customers. This allows for the reuse of defined network slices 510b, 511b, 512b for different users, for example as a new network instance 510a, 511a, 512a. A network slice 510b, 511b, 512b, which is associated, for example, with an automotive application can also be used for applications in various other industrial applications. The slices instances 510a, 511a, 512a, generated by a first user, can for example be independent of the slices instances that were generated by a second user, although the entire network slice functionality may be the same.

By using the radio scheduler described above with respect to FIGS. 1 and 2, radio resources of the communication network 400 can be scheduled. The radio scheduler 105 may be a part of the network 500 or may be arranged outside the network 500, for example in a foreign network. The radio scheduler 105 may for example be located in a network slice 510b or slice instance 510a. Network entities requesting resources of the communication network 500 may for example be network nodes of the infrastructure and resources layer 405, or network nodes of the activation layer 404 or network slices or slice instances of the application layer 403. Network entities requesting resources of the communication network 500 may also be mobile devices, base stations, base station controllers, radio network controllers etc. requesting resources for initiating a communication channel over the communication network.

The methods, systems and devices described herein may be implemented as electrical and/or optical circuit within a chip or an integrated circuit or an application specific integrated circuit (ASIC). Embodiments of the invention can be implemented in digital and/or analogue electronic and optical circuitry.

The methods, systems and devices described herein may be implemented as software in a Digital Signal Processor (DSP), in a micro-controller or in any other side-processor or as hardware circuit within an application specific integrated circuit (ASIC) of a DSP.

Embodiments of the invention can be implemented in digital electronic circuitry, or in computer hardware, firmware, software, or in combinations thereof, e.g. in available hardware of conventional optical transceiver devices or in new hardware dedicated for processing the methods described herein.

The present disclosure also supports a computer program product including computer executable code or computer executable instructions that, when executed, causes at least one computer to execute the performing and computing steps described herein, in particular the method 300 as described above with respect to FIG. 3 and the techniques described above with respect to FIGS. 1 to 5. Such a computer program product may include a readable non-transitory storage medium storing program code thereon for use by a computer. The program code may perform the methods as described above with respect to FIGS. 1 to 3.

While a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A radio communication network, comprising:
at least one base station configured to transmit a data flow to at least one user equipment (UE) by using radio resources scheduled to the at least one base station for transmission of the data flow;
a radio scheduler configured to schedule the radio resources to the at least one base station according to a scheduling metric;
a monitoring entity configured to monitor performance information from the at least one base station;
a controller configured to adjust the scheduling metric of the radio scheduler based on the monitored performance information; and
a database configured to store a plurality of scheduling metrics;
wherein the controller is configured to replace the scheduling metric with one of the scheduling metrics stored in the database or with a combination of scheduling metrics stored in the database;
wherein the database comprises a plurality of inter cell interference coordination (ICIC) schemes;
wherein the controller is configured to select one or a combination of the ICIC schemes from the database for adjusting the radio scheduler; and
wherein the radio communication network further comprises a network orchestration entity configured to:
load scheduling metrics from the plurality of scheduling metrics based on a request for setting up a network slice;
assign different radio schedulers to different groups of base stations according to specific scheduling metric requirements; and
configure the scheduling metrics based on a service function chain template which defines multiple combinations of metrics and ICIC schemes.

2. The radio communication network of claim 1, wherein the controller is configured to adjust the scheduling metric based on the plurality of scheduling metrics stored in the database.

3. The radio communication network of claim 1, wherein the controller is configured to replace the scheduling metric based on a geographic location of the at least one base station.

4. The radio communication network of claim 1, wherein the controller is configured to replace the scheduling metric based on monitored information and/or requirements of incoming data flows of different services.

5. The radio communication network of claim 1, wherein the controller is configured to activate or deactivate combinations of scheduling metrics.

6. The radio communication network of claim 1, wherein the database comprises a plurality of basic scheduling schemes; and
wherein the controller is configured to select one or a combination of the basic scheduling schemes.

7. The radio communication network of claim 6, wherein the basic scheduling schemes comprise round robin, max/min, proportional fair, and/or equal data rate;
wherein the ICIC schemes comprise enhanced inter-cell interference coordination (eICIC), carrier aggregation (CA) based ICIC, coordinated multi-point (CoMP) transmission point blanking (TPB), CoMP joint transmission (JT), coordinated beamforming, centralized scheduling; and/or
wherein the scheduling is based on a quality-of-service (QoS) class and/or a service level agreement (SLA).

8. The radio communication network of claim 1, wherein the monitoring entity is configured to monitor the following performance information from the at least one base station:
a Quality of Service (QoS) for the at least one UE,
a service level agreement (SLA) for a logical network including the at least one base station,
a traffic demand for the at least one UE, and/or
conditions of a radio link to the at least one UE.

9. The radio communication network of claim 1, wherein the communication network comprises a plurality of base stations; and
wherein the controller is configured to adjust the scheduling metric of the radio scheduler per base station or per base station cluster of the plurality of base stations.

10. The radio communication network of claim 1, wherein the radio scheduler is configured to apply a first scheduling metric to a cluster of base stations located in a first area of the radio communication network, and to apply a second scheduling metric to a cluster of base stations located in a second area of the radio communication network.

11. The radio communication network of claim 1, further comprising:
a network according to a fifth generation (5G) or according to a further generation; and
wherein at least a part of the radio scheduler is implemented as a virtual network function of an activation layer of the 5G or further generation network communicating with a physical layer of the 5G or further generation network.

12. The radio communication network of claim 11, wherein the radio scheduler is configured to schedule radio resources of a first network slice of the 5G or further generation network and radio resources of a second network slice of the 5G or further generation network according to a common scheduling metric.

13. The radio communication network of claim 12, wherein the common scheduling metric is designed according to an optimization criterion to best fit requirements of the first network slice and the second network slice concurrently.

14. The radio communication network of claim 1, wherein the controller is configured to adjust the scheduling metric for a first network based on a service level agreement (SLA) required or agreed upon for the first network and for a second network based on an SLA required or agreed upon for the second network.

15. The radio communication network of claim 12, wherein the common scheduling metric is based on an optimization criterion with respect to concurrent requirements of the first network slice and the second network slice.

* * * * *